Nov. 8, 1932.   P. M. LOCKWOOD ET AL   1,886,488
UPHOLSTERY COVER
Filed Nov. 8, 1930   2 Sheets-Sheet 1
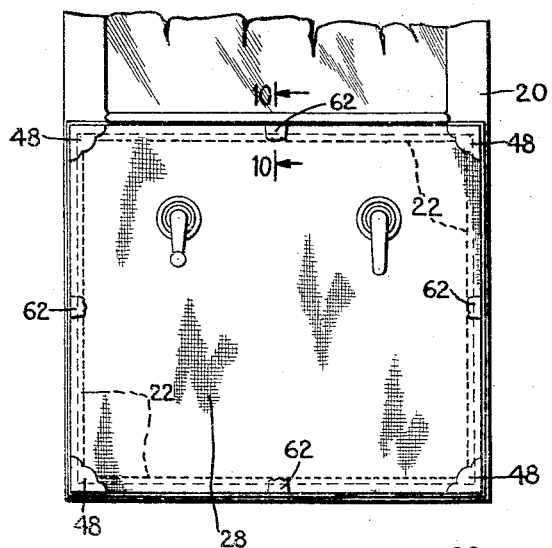
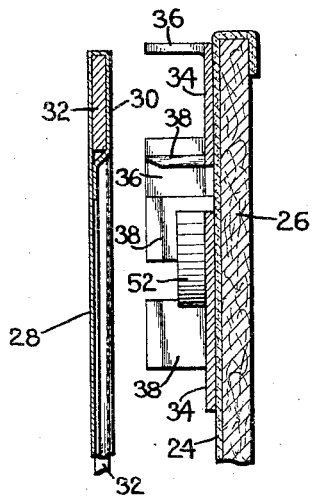
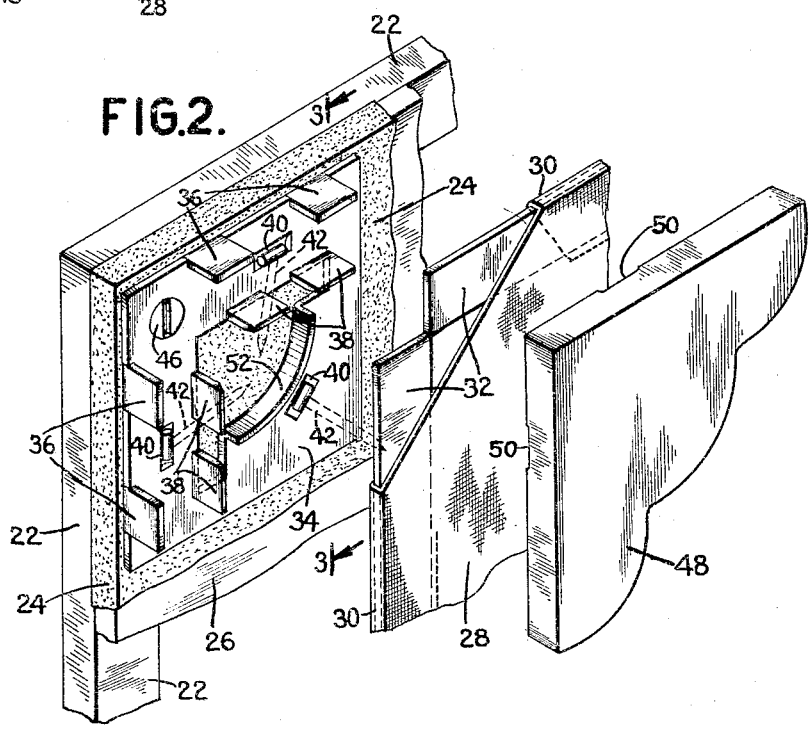
INVENTORS
Paul M. Lockwood
Emanuel Samel
BY their ATTORNEYS
Cooper, Kerr & Dunham

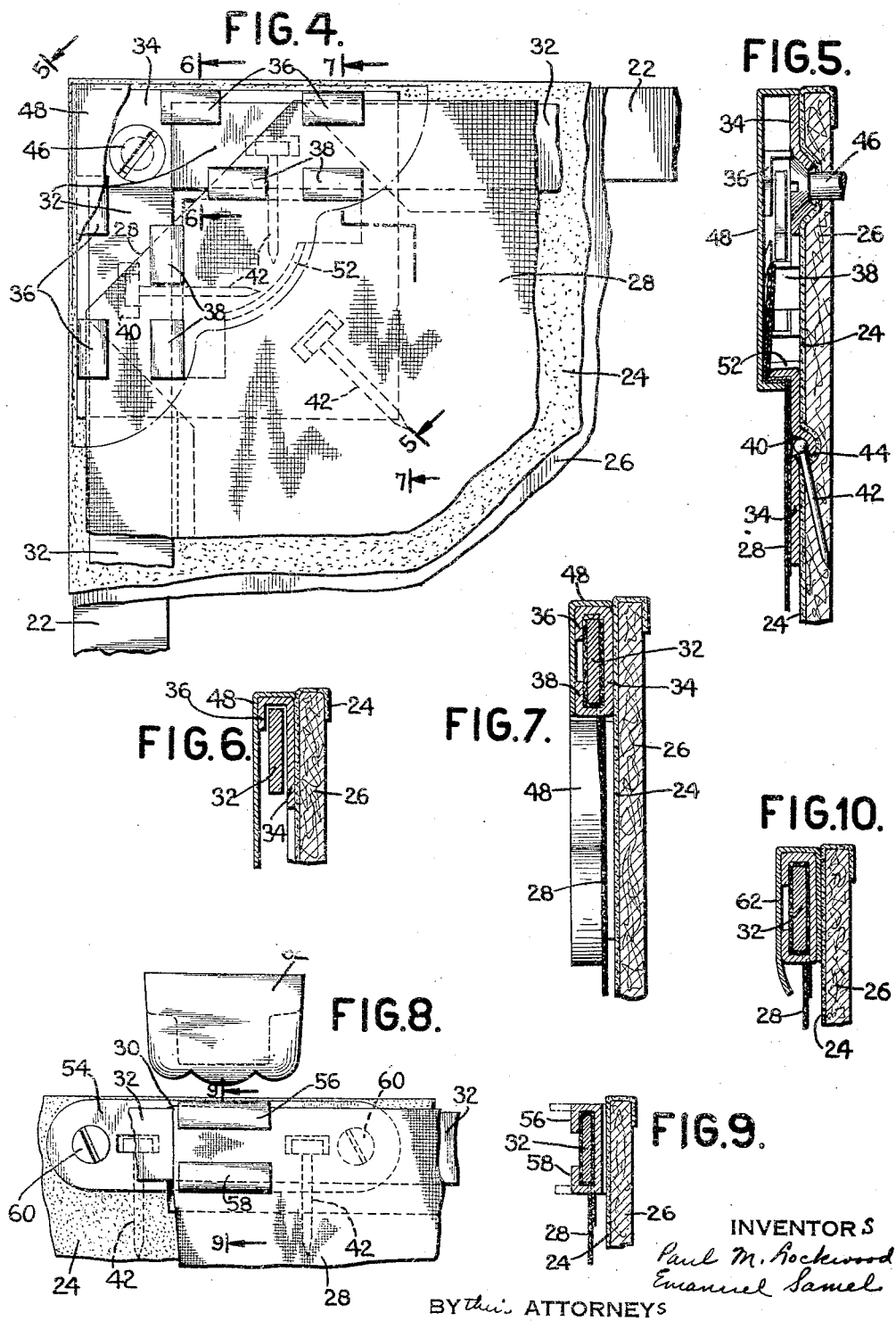

Patented Nov. 8, 1932

1,886,488

UNITED STATES PATENT OFFICE

PAUL M. LOCKWOOD, OF SHORT HILLS, AND EMANUEL SAMEL, OF DENVILLE, NEW JERSEY; SAID LOCKWOOD ASSIGNOR TO SAID SAMEL

UPHOLSTERY COVER

Application filed November 8, 1930. Serial No. 494,264.

This invention pertains to upholstery covers of the type especially adapted for the protection of the upholstery of automobiles.

The principal object of the invention is to provide fastening and supporting devices for the covers, which may be easily applied or removed, whether the automobile frame be made of wood or steel; which will support the covers neatly and prevent sagging of the edges thereof; and which will be inexpensive to manufacture.

Further and other objects and advantages will be apparent from the specification and claims, and from the drawings which illustrate what is now considered the preferred form of the invention.

Fig. 1 shows a cover applied to the lower panel of an automobile door.

Fig. 2 is an exploded perspective view of the upper left hand corner of the cover of Fig. 1.

Fig. 3 is a cross-section of Fig. 2, on the line 3—3.

Fig. 4 is an enlarged detail view of the upper left hand corner of the cover of Fig. 1, with detachable ornamental plate removed.

Fig. 5 is a cross-section on line 5—5 of Fig. 4.

Fig. 6 is a cross-section on line 6—6 of Fig. 4.

Fig. 7 is a cross-section on line 7—7 of Fig. 4.

Fig. 8 is an enlarged exploded view of an intermediate support for the cover.

Fig. 9 is a cross-section on line 9—9 of Fig. 8.

Fig. 10 is a cross-section on the line 10—10 of Fig. 1.

For convenience of illustration the invention is shown applied to the lower panel of an automobile door, designated 20 in the drawings, and having a lower framework 22 of wood or metal, to which is fastened the upholstery which is to be protected. It is customary, in the manufacture of automobiles, to first apply the upholstery 24 to a sheet of cardboard 26 and then fasten the fabric and cardboard to frame 22 by means which forms no part of this invention.

In the practice of the invention, fabric 28 of the upholstery cover is provided along each of its edges with a hem 30, and in each hem is placed a bar 32, preferably of steel. For convenience, the corners of the fabric may be cut away as in Fig. 2 in order to expose the ends of bars 32.

Each corner of the cover is supported by a fitting 34 adapted for easy attachment to the upholstery and its backing plate of cardboard, and even to the frame behind the cardboard. Fitting 34 is preferably in the form of a stamping provided with integral ears 36 and 38 on its outer and inner edges, and adapted to engage bars 32 as will appear. In the surface of the fitting are depressions 40 to accommodate the T-heads of pins 42, the shanks of which pass through holes 44 in depressions 40, and through upholstery 24 to obliquely enter and engage cardboard 26, as is best shown in Fig. 5. A satisfactory arrangement of pins is shown in the drawings, one being vertical, one horizontal, and one diagonal. If the door frame be of wood, a screw 46 may be used in addition to, or in place of, the pins in order to hold the fitting in place.

After the corner fittings above described have been secured in position, the ends of bars 32 (Fig. 2) are placed between the rows of ears 36—38 and the ears are then bent over (Fig. 4) to hold the bars in place, whereby the cover 28 is maintained in stretched condition over the upholstery, as in Fig. 1. It might appear from the drawings that cover 28 would be damaged by prongs 38 but such is not the case. The ends of the hems are cut away as indicated by the dotted lines of Figs. 2 and 4. Furthermore, the dimensions of the ears or prongs have been exaggerated in the drawings for clarity of illustration,—therefore any punctures in fabric 28 are really insignificant. In any event the interior of the fitting is entirely concealed by ornamental cap 48, provided with in-turned lips 50 which snap over the edges of fitting 34 to hold the cover plates in operative position as in Figs. 1, 4 and 5. Cap 48 rests on turned-over ears 36, 38 and on upstanding, outwardly flared flange 52, which it also engages by a lip similar to lip 50.

The above described devices are sufficient to practice the invention provided the distance from corner to corner is not too great. If the tension of the fabric is sufficient to bend bars 32 between corner supports it is advisable to provide supplemental supports spaced, as necessary, between the corners. One form of such support is shown in Figs. 8, 9 and 10, comprising a bracket 54 having ears 56 and 58 and adapted to be secured to the upholstery and its cardboard backing by T-head pins 42 as described for the corner fitting. Screws 60 may be used if the frame is of wood, in which case the pins may be omitted. Ears 56, 58 are bent into locking position after the upholstery cover is in place, and are then concealed by an ornamental spring cap 62 snapped into place as indicated in Fig. 10. Bracket 54 is slightly offset or bowed to accommodate the rear plate of cap 62.

Cover 28 may be readily taken off for cleaning by first removing ornamental caps 48, 62 and then straightening lugs 38, 58.

It is to be understood that the invention is not limited to the specific details herein described and illustrated but may be carried out in other ways without departure from its spirit as defined by the following claims.

We claim—

1. In a cover for automobile upholstery and the like, in combination, a sheet of cover fabric having a hem at each edge, a bar through each hem, and a fitting at each corner of the fabric for engaging two divergent bars to thereby hold all edges of the cover in operative position on the upholstery.

2. In a cover for automobile upholstery and the like, in combination, a sheet of cover fabric having a hem at each edge, a bar through each hem, and fittings spaced about the upholstery for engaging said bars to hold all the edges of the cover in operative position on the upholstery.

3. In a cover for automobile upholstery and the like, in combination, a sheet of cover fabric having a hem at each edge, a bar through each hem, fittings spaced about the upholstery for engaging said bars to hold the cover in operative position on the upholstery, and readily detachable ornamental caps on said fittings.

4. In a cover for automobile upholstery having cardboard backing, in combination, a sheet of cover fabric having a hem at each edge, a bar through each hem, fittings spaced about the upholstery for engaging said bars to hold the cover on the upholstery, and means comprising pins insertable through said fittings into the cardboard backing for securing said fittings in operative position.

5. In a cover for automobile upholstery and the like, in combination, a sheet of cover fabric having a hem at each edge, a bar through each hem, and fittings spaced about the upholstery for engaging said bars to hold the cover in operative position on the upholstery, said fittings having ears adapted to be bent over the edges of said rods, for the purpose set forth.

In testimony whereof we hereto affix our signatures.

EMANUEL SAMEL.
PAUL M. LOCKWOOD.